United States Patent [19]

Breitmeier

[11] Patent Number: 4,748,322
[45] Date of Patent: May 31, 1988

[54] APPARATUS FOR DETERMINING THE DISTANCE BETWEEN A MEASURING SURFACE AND A REFERENCE SURFACE

[76] Inventor: Ulrich O. Breitmeier, Nobelstr. 15, D-7000 Stuttgart 80, Fed. Rep. of Germany

[21] Appl. No.: 912,097

[22] Filed: Sep. 29, 1986

[30] Foreign Application Priority Data

Oct. 15, 1985 [DE] Fed. Rep. of Germany ....... 3536700

[51] Int. Cl.⁴ ............................................. G01J 1/20
[52] U.S. Cl. ....................................... 250/201; 356/4
[58] Field of Search .................. 250/201 R, 201 AF; 356/373, 375, 4, 5

[56] References Cited

U.S. PATENT DOCUMENTS

| | | | |
|---|---|---|---|
| 4,433,235 | 2/1984 | Akiyama et al. | 250/201 AF |
| 4,527,893 | 7/1985 | Taylor | 356/4 |
| 4,572,607 | 2/1986 | Krizik | 356/373 |
| 4,592,829 | 6/1986 | Neümann et al. | 250/201 AF |
| 4,600,299 | 7/1986 | Abshire | 356/5 |
| 4,620,089 | 10/1986 | Schlichting et al. | 250/201 AF |

Primary Examiner—David C. Nelms
Assistant Examiner—Jessica L. Ruoff
Attorney, Agent, or Firm—Fred Philpitt

[57] ABSTRACT

An apparatus for the highly accurate measurement of measuring surfaces (14) has a lens (68) pre-tensioned by spring members (84, 86), which lens is connected to a magnetic adjusting sleeve (74). The latter cooperates with an annular coil (140) surrounding it. A light source (60) directs a narrow light beam (62) towards the measuring surface (14). The beam reflected by the latter is deflected by a combination prism (90) and split into two partial beams, which reach photoelectric transducers (116, 118). The output signal thereof serves for adjusting the supply current for the annular coil (140). Provided behind the lens (68) is a glass plate (78) which is mirrored with the exception of a central circular region (82), so that light beams reflected by the measuring surface with a considerable inclination with respect to the axis of the apparatus are thrown back again onto the measuring surface and are supplied to the detection system along the axis of the apparatus.

23 Claims, 5 Drawing Sheets

APPARATUS FOR DETERMINING THE DISTANCE BETWEEN A MEASURING SURFACE AND A REFERENCE SURFACE

DESCRIPTION

The invention relates to an apparatus for determining the distance between a measuring surface and a reference surface.

An apparatus of this type is described in the journal "Applied Optics", volume 22, number 24, pages 3983-3987. In the latter, small changes in the distance between a measuring surface and reference surface are measured, in that the output signal of the differential amplifier is used directly as the measuring signal. However, the output signal of this differential amplifier changes solely in a relatively small region in a linear manner with changes in the distance between the measuring surface and the reference surface. Therefore, in the known apparatus, in the case of relatively great changes in the distance to be measured, the entire measuring head is moved relative to the reference surface and the distance of the measuring head from the reference surface is determined by a separate interferometer. The rough measurement of distance obtained in this way is added by computer to the fine measurement of distance formed by the output signal of the reference amplifier.

Now interferometers are relatively expensive and must be adjusted carefully to the reference surface. Furthermore the measuring process is very time-consuming and inaccurate if a surface profile can only be measured as a whole with additional displacement of the measuring head.

The present invention therefore intends to provide an apparatus for determining the distance between a measuring surface and a reference surface, in which the measuring region, which can be covered as a whole without moving the measuring head, is increased.

In the apparatus according to the invention, the output signal of the differential amplifier is not used directly as a measuring signal, on the contrary it serves solely for adjusting the supply circuit of an electro-magnet moving the lens in the direction of the axis of the apparatus against a pre-tensioning force. The transducer arrangement and the differential amplifier are thus used solely for the zero balance of a regulating circuit, whereas the actual measuring signal is a signal associated with the magnitude of the magnet supply current. The measuring range of the apparatus according to the invention is thus no longer restricted by the useful working capacity of the transducer arrangement, on the contrary it results from the axial travel of the lens adjustment. However, the latter can be chosen to be quite large with a relatively small expenditure.

Indeed, devices for the automatic focussing of a light source on a measuring surface are known per se, in which use is made of a lens which is able to travel due to a magnet axially in opposition to the pre-tensioning force, in which case the adjustment of the magnet supply current takes place using a differential amplifier starting from the output signals of two transducers, which receive two partial beams of the light reflected by the measuring surface and produced by a prism so that at the time of defocussing, their output signals vary in opposite directions. An automatic focussing device of this type for use on compact disc players or videos is described in German OS No. 29 14 122. However, a measurement of distance does not take place in the latter.

The non-linearity of the spring arrangement used for pre-tensioning the lens in one direction can be compensated for in a simple manner in accordance with the present invention. The axial adjustment path of the lens may thus be chosen to be greater than the linear range of the spring characteristic of the pre-tensioning springs, which is an advantage again with regard to the largest possible measuring range of the apparatus.

In another embodiment of the invention, centering of the lens on the axis of the apparatus is obtained at the same time by the spring pre-tensioning the lens.

The development of the invention according to another embodiment is an advantage with regard to a characteristic of the pre-tensioning spring which is linear over a wide range.

A magnetic radial mounting of the lens according to another embodiment magnetic pre-tensioning of the lens in its axial inoperative position according to a further embodiment are an advantage with regard to the avoidance of temperature-related measuring errors and mechanical jamming.

In the case of many surfaces to be measured, the small surface section of the measuring surface reflecting the measuring light at a point of time under consideration is frequently not perpendicular to the axis of the apparatus. Surface sections having a considerable inclination of this type are to be found in particular on rough surfaces. However, if the light is reflected by the measuring surface at a considerable angle with respect to the direction of incidence, it no longer reaches the transducer arrangement, so that a measurement of distance would no longer be possible. With the development of the invention according to another embodiment it is ensured that light beams reflected at a considerable angle with respect to the direction of incidence are reflected by the reflector device substantially back on themselves to the surface section of the measuring surface just measured, by which they are reflected a second time under substantially the same conditions as the first time, so that the reflected light returns as a whole substantially on the axis of the apparatus.

Thus, with an apparatus according to this embodiment, even surface sections of the measuring surface having a considerable inclination can be measured exactly. An apparatus according to this embodiment is thus particularly suitable for determining the microprofile of rough surfaces, in which case the apparatus is moved along a predetermined scanning line above the measuring surface and the measuring signal is recorded. A further advantage of the apparatus according to this embodiment is that apart from the reflector device, the remaining optical members need to have solely small dimensions in the direction at right angles to the path of light.

The reflector device described in a further has a particularly simple mechanical construction and due to the fact that marginal rays pass through the lens twice substantially in the same annular region, an extensive compensation of the distortion errors of the lens also takes place, although relatively slight tilting of the light beam reflected behind the lens with respect to the axial ideal position, does not have any serious effect on the measurement result, since the passage of the output signal of the differential amplifier through zero is insensitive with respect to tilting of the rays in orders of magnitude of up to 10°. Only the amplitude of the output signal of the differential amplifier which is obtained as a maximum at the time of defocussing, decreases at the time of tilting. However, since in the apparatus according to the invention, solely the passage through zero (change of sign) of the output signal of the differential amplifier is evaluated, small tilting of the rays, such as result from distortion errors of the total optical system, have no effect.

Since plane parallel discs may originally effect a correction of the distortion error of converging lenses, with the development of the invention according to another embodiment, a further improvement in the distance measurement of considerably inclined surface sections of the measuring surface is achieved.

The development of the invention according to another embodiment allows the use of standard objectives having a small diameter, such as are used for scanning compact discs and videos. Objectives of this type are manufactured in large numbers and can be obtained economically.

When using powerful light sources such as lasers, one can use a reflection hologram as the reflector device at the sam time correcting the edge distortion of the lens objective, which was carried out using a correspondingly aspherically corrected lens. Whereas lenses of this type are expensive to manufacture, by using a pattern lens of this type, reflection holograms when once produced can be reproduced phototechnically in a simple manner.

The development of the invention according to another embodiment is likewise an advantage with regard to the economic production of an aspherically corrected objective having a large diameter. Since holograms may be produced on very thin substrates, with the development of the invention according to this embodiment, a reduction of the moving mass of the objective is achieved, which is an advantage as regards the regulating constant in automatic focal point resetting.

If transducers are used for measuring the position of the light impinging on the transducer arrangement, as described in another embodiment, then the output signal of the transducer and thus also of the differential amplifier is largely independent of the specific geometry of the beam cross section, since these transducers integrate in effect over the surface illuminated by the light and provide a signal associated with the position of the point of concentration of intensity of the beam cross section, which is independent of the specific cross sectional shape.

The development of the invention according to another embodiment is an advantage as regards the construction of the supply circuit from economic, current digital components and also allows a simple display of the measurement result.

The development of the invention according to a further embodiment ensures that not only a very small surface section of the measuring surface but at the same time also a larger annular section of the measuring surface located around the latter is measured. The output signal of the second differential amplifier corresponds to the average distance between the measuring surface and reference surface in the vicinity of the actual measuring point. Decoupling of the two measuring channels is ensured by the given geometry of the optical paths.

In an apparatus according to still another embodiment, one has simultaneous, absolutely sharp focussing of both light sources, as can be achieved with a conventional optical system solely for very closely adjacent wave lengths. However, very different wave lengths are an advantage with regard to a clean separation of the two reflecting light rays, when using filters which are not too expensive.

The development of the invention according to another embodiment also takes place with regard to decoupling of spot measurement and integral measurement.

In an apparatus according to another embodiment, one can measure selectively the average distance of a larger section of the measuring surface and the distance of a small measuring spot of the measuring surface from the reference surface.

Since an apparatus according to the invention produces high output signals even for very small changes in distance between the measuring surface and the reference surface, an apparatus of this type also responds in a sensitive manner to relative movements between the measuring head and measuring surface which are caused by vibrations and cannot be completely precluded by mechanical guides. With the development of the invention according to another embodiment it is ensured that vibrations of this type have no effect when determining the distance.

This effect is achieved with the development of the invention according to another embodiment, without additional mechanical measures, by special evaluation of the output signals of the first or preferably second differential amplifier.

The invention is described in detail hereafter by means of embodiments, with reference to the drawings, in which.

Figure 1:
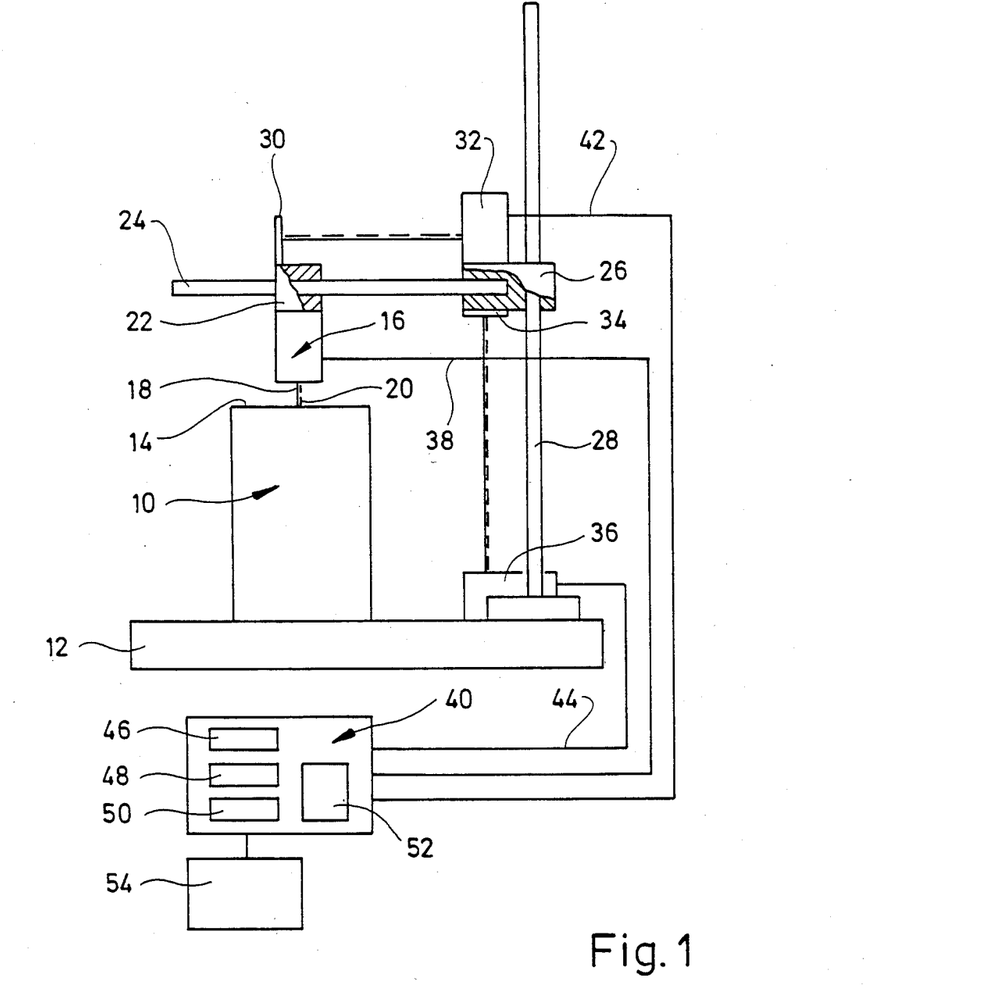
FIG. 1 shows an apparatus for the microscopically accurate measurement of a measuring surface on a workpiece.

FIG. 1 shows a workpiece 10 on a marking plate 12. Provided above the workpiece 10 for measuring the microprofile of the upper end face 14 of the workpiece is a measuring head 16, which sends a beam of light 18 in the vertical direction towards the end face 14 and in turn receives a light beam 20 reflected by the latter. Details of the measuring head 16 and of an electronic evaluation circuit are described hereafter with reference to FIG. 2.

The measuring head 16 is able to slide by way of a sliding member 22 without clearance on a horizontal guide rod 24. The latter is supported by a further sliding member 26, which is able to slide without clearance on a vertical guide rod 28.

Provided for measuring the distance of the sliding member 22 from the guide bar 28 is a first range finder, which comprises a mirror 30 carried by the sliding member 22 and an optical sensor unit 32 cooperating with the latter. Provided in a similar manner for determining the distance of the sliding member 26 above the upper side of the marking plate 12 is a mirror 34 supported by the sliding member 26 and a sensor unit 36 located on the marking plate 12. The two range finders associated with the sliding members may be constructed as a whole as interferometers, as known per se. Also a guide device operative at right angles to the plane of the drawing together with a third range finder may be provided for the third coordinate direction.

The measuring head 16 is connected by way of a lead 38 to a central unit 40, leads 42, 44 serve for connecting the sensor unit 32 and 36 to the central unit. The latter has a first display area 46 for the output signal of the measuring head 16 associated with the micro-profile of the end face 14, a second display area 48 for the local total distance between the region of the end face 14 just measured and the upper side of the marking plate 12 as well as a third display area 50 for the horizontal coordinate associated with the sensor unit 32.

A keyboard 52 serves for pre-adjustment of the method of operation of the measuring apparatus, for example as to whether the measuring head 16 is intended to measure a very small region of the end face 14 (spot measurement) or an extended region of the end face 14 (integral measurement). Furthermore, the origins of coordinates can be displaced by way of the keyboard 52. A printer 54 is also connected to the central unit 40, by which the output signal of the measuring head 16 depending on the horizontal measuring head position can be recorded.

Figure 2:
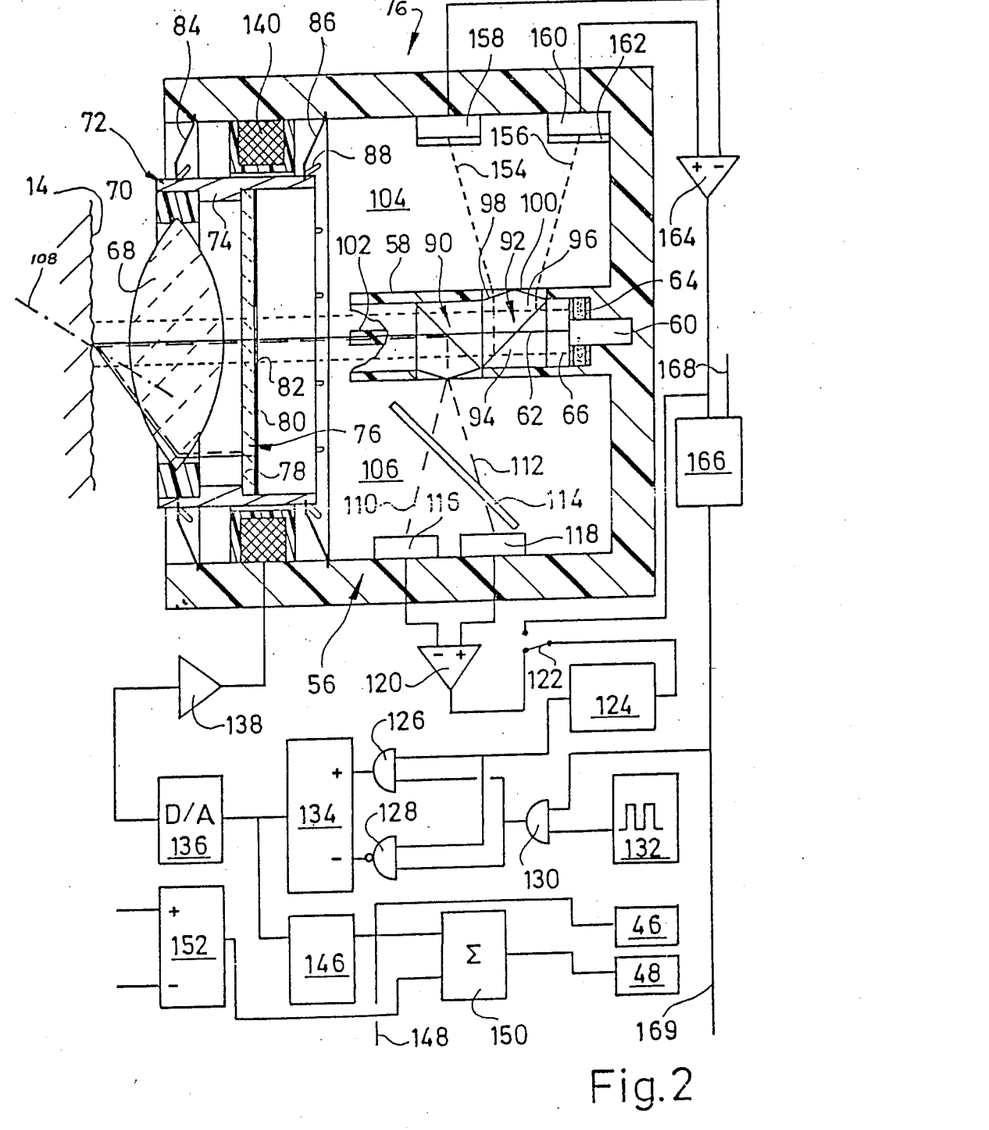
FIG. 2 is an axial section through the measuring head of the apparatus illustrated in FIG. 1 and shows a block circuit diagram of the associated evaluation circuit.

As shown in FIG. 2, the measuring head 16 has a cupshaped housing designated generally by the reference numeral 56, from the base of which a socket 58 having a substantially square cross section extends towards the left in FIG. 2. Located in the base of the socket is a laser diode 60, which directs a light beam 62 of small diameter onto the workpiece. The laser diode 60 is surrounded by a second annular light source 64, which may be formed for example by an incandescent coil closed to form a ring or by a gas discharge unit. The light source 64 produces a pencil of light 66 having a substantially annular cross section, which likewise falls onto the workpiece 10. The wave length of the light emitted by the laser diode 60 is chosen so that it does not overlap the spectrum of the pencil of light emitted by the light source 64.

Provided at the open end of the housing 56 is a lens 68, which focusses the light beam 62 and the pencil of light 66 on the end face 14 of the workpiece 10. The lens 68 is seated in a mounting 70, which is in turn positioned in a magnetic adjusting sleeve 72. For this purpose, the inner surface of the magnetic sleeve 72 has a positioning collar 74 projecting radially inwards, which defines two annular abutment shoulders.

Positioned against the abutment shoulder of the positioning collar 74 located on the right in FIG. 2 is a circular mirror 76, which comprises a transparent, plateshaped base member 78, on which a metal layer 80 is located on its surface remote from the lens, in which case the metal layer 80 has a circular, central opening 82, the diameter of which corresponds to the diameter of the light source 64.

At its axial ends, the adjusting sleeve 72 is mounted by conical, annular spring members 84, 86, whereof the radially inner ends engage in the outer surface of the adjusting sleeve 72 and whereof the outer edges are fixed in the peripheral wall of the housing 56. The conical regions of the spring members 84, 86 are provided with slots 88, so that a plurality of spring arms distributed in the peripheral direction are formed and the spring members have a better linear spring characteristic. The spring members 84, 86 thus center the adjusting sleeve 72 and thus also the lens 68 on the axis of the apparatus, that is to say the axis of the socket 58 and the light beam emitted on the latter by the laser diode 60.

Located one behind the other in the socket 58 are two combination prisms designated generally by the reference numerals 90 and 92. The latter each consist of a 90-degree prism 94 facing the laser diode 60, attached to the base of which is a modified 90-degree prism 96, which on one of its two short sides comprises two boundary surfaces 98, 100 together forming a beam-dividing prism and enclosing an obtuse angle. In the combination prism 90, the boundary surfaces 98, 100 point downwards in FIG. 2, whereas in the combination prism 92, these surfaces point upwards in FIG. 2.

Intermediate walls 102 attached to the socket 58, which walls are at right angles to the plane of the drawing of FIG. 2, divide the interior of the housing surrounding the socket 58 into an upper housing chamber 104 and a lower housing chamber 106, which are decoupled optically.

As shown in FIG. 2, the end face 14 to be measured is not exactly flat, but rough. The normal of the surface section, onto which the light beam 62 impinges, is designated by the reference numeral 108 in the drawing. It is tilted considerably with respect to the axis of the apparatus, so that the light beam 62 is reflected by the illuminated surface section into the edge region of the lens 68. Since the lens 68 is located so that the illuminated surface section of the end face 14 lies at the focal point or is close to the latter, the reflected light beam 62 is refracted by the lens 68 substantially parallel to the axis of the apparatus and falls substantially at right angles onto the mirror 76 which is at right angles to the axis of the apparatus. From there the light beam returns to the lens 68 as shown in broken line and is again focussed on that section of the surface of the end face 14 to which the normal line 108 belongs. In the case of the reflection of the light beam 62 on this section of surface, which now takes place for the second time, the light beam is returned substantially along the axis of the apparatus and returns to the combination prism 90. At this point, part of the returning light beam is deflected downwards by the mirrored surface of the combination prism in FIG. 2 and is split into two partial beams 110, 112 by the attached pentaprism. These partial beams pass by way of a narrow-band interference filter 114 to two opto-electrical transducers 116, 118, which lie symmetrically with respect to the partial beams 110, 112 with an exact position of the reflecting surface section of the end face 14 at the focal point of the lens 68 and thus produce the same output signal. If the distance between the lens 68 and the reflecting surface section of the end face 14 is altered, when the partial beams 110, 112 travel in the opposite direction in the lateral direction towards the transducers 116, 118, so that their output signals vary in the opposite direction.

The outputs of the transducers 116, 118 are connected to the inputs of a differential amplifier 120. The output of the latter is connected by way of a change-over switch 122 and a delay member 124 to one input of an AND-gate 126 or of a NAND-gate 128, whereof the second inputs are connected by way of a further AND-gate 130 to the output of a free wheeling pulse generator 132. As will be described in more detail hereafter, a second input of the AND-gate 130 always receives a control signal when the measuring head 16 is not exposed to any inadmissible vibrations.

The output of the AND-gate 126 is connected to the upwards counting terminal of an up/down counter 134.

The downwards terminal of the latter is connected to the output of the NAND-gate 128. The output signal of the up/down counter 134 is supplied to the input of a digital-to-analog coverter 136, whereof the output signal is amplified by an amplifier 138 and serves for exciting an annular magnetic coil 140. The latter surrounds the magnetic adjusting sleeves 72 with a narrow clearance fit and is fixed to the peripheral wall of the housing 56.

As already described above, the output signal of the differential amplifier 120 is proportional to the distance of the instantaneous reflecting surface section of the end face 14 from the focal point of the lens 68. The state of the up/down counter 134 is varied by way of the electronic switch formed by the AND-gate 126 and the NAND-gate 128 according to the sign of the output signal of the differential amplifier 120, using the pulses provided by the pulse generator 132, so that the supply current for the magnetic coil 140 is increased or reduced so that due to the axial adjustment of the adjusting sleeve 72 cooperating with the magnetic coil 140, the focal point if the lens 68 is located exactly at the instantaneous reflecting surface section of the end face 14. The stage of the up/down counter 134 is thus a measurement of the spacing of the instantaneous reflection surface section of the workpiece from a reference surface, for example of the front or rear end face of the housing 56 of the measuring head 16.

Since the spring members 84, 86 no longer have an exactly linear spring characteristic for very great deflections of the adjusting sleeves 72, the output signal of the up/down-counter 134 is supplied to a characteristic circuit 146, which contains the lens-displacement paths corrected with regard to non-linearity of the spring members 84, 86, for example in storage cells which are addressed by the output signal of the up/down counter 134.

The output signal of the characteristic circuit 146 is used for controlling the display area 46 and is made available by way of a lead 148 for controlling the printer 54 or for other data processing. Also connected to the output signal of the characteristic circuit 146 is one input of a summing circuit 150, whereof the second input receives the output signal of an up/down-counter 152, which is connected at the input side to the sensor unit 36. The output signal of the summing circuit 150 thus corresponds to the total distance of the surface section of the end face 14 just measured from the upper side of the marking plate 12 and is displayed on the display area 48.

Due to the combination prism 92, the returning pencil of light obtained by reflection of the pencil of light 66 is deflected upwards in FIG. 2 and divided into two partial pencils of light 154, 156. The latter also pass to opto-electrical transducers 158, 160 again arranged symmetrically with respect to the desired axes of the partial pencils of light, in front of which transducers a filter 162 is respectively located, which blocks the wave length of the light beam 62 and lets through the spectrum of the pencil of light 66 partly or completely.

The outputs of the transducers 158, 160 are connected to the inputs of a differential amplifier 164, whereof the output is connected to the second contact of the change-over switch 122. By throwing the change-over switch 122, the focal point re-adjustment can be carried out by axial displacement of the lens 68 optionally also depending on the average distance of a larger, illuminated surface area of the end face 14 from the focal point of the lens 68.

The output of the differential amplifier 164 is also connected to a blocking control circuit 166. The latter checks the output signal of the differential amplifier 164 as to whether higher frequency portions are contained in this signal. If this is not the case, then the blocking control circuit 166 produces a high level signal at its output; if high-frequency portions are ascertained in the output signal of the differential amplifier 164, then the output of the blocking control circuit 166 is low level. Since the transducers 158, 160 receive light which corresponds to an optical average over a larger surface region, alternating portions in the output signal of the differential amplifier 164 mean that the distance between the lens and surface to be measured has been varied by disturbance influences such as vibrations. Since a signal is no longer supplied to the second input of the AND-gate 130 under such conditions, the automatic focal point re-adjustment is interrupted as long as mechanical disturbance influences are present. Since the delay member 124 is provided, the blocking control circuit 166 may block the AND-gate 130 before changes to the output signal of the differential amplifier 120 resulting from vibrations come into effect.

The blocking control circuit 166 may also receive a signal by way of a lead 168, which signal indicates whether the measuring head 16 is moved in a plane parallel to the end face 14, in which case a small portion of alternating components in the output signal of the differential amplifier 164 is tolerated for the duration of the displacement, as it possibly remains when the annular surface, over which the pencil of light 66 forms an average, contains very great irregularities. For example the blocking control circuit 166 may consist of a high pass filter with subsequent rectifier and inverter.

The output signal of the blocking control circuit 166 is also made available on a lead 169 and can be used for example for stopping motors for moving the measuring head 16 over the end face 14 until after the fading of vibrations, a correct measurement signal was obtained at the respective location of the measuring head.

If a surface section of the end face 14, whose normal line to the axis of the apparatus is not even tilted or tilted only slightly, is located in front of the measuring head illustrated in FIG. 2, then the reflected light beam passes through the lens and the opening 82 in the metal layer 80 directly back to the detection system.

In FIG. 2, for the sake of greater clarity, only those partial beams or partial pencils obtained by splitting of the light beam 62 or of the pencil of light 66 are shown which are relevant for obtaining the measurement result. For the pencil of light 66 having the annular cross section, only the rays for reflection surfaces of the workpiece which are perpendicular to the axis of the apparatus are shown. It will be understood that with the very many surface sections of the end face 14 illuminated by the pencil of light 66 which is tilted considerably to varying extents with respect to the axis of the apparatus, similar courses of beams are obtained, which after reflection on the metal layer 80 again return substantially to the axis of the apparatus, as is shown in detail for the light beam 62.

If in a measuring head 16 which is simplified with respect to FIG. 2, the possibility of integral measurement is dispensed with, then the input of the blocking control circuit 166 may also be connected to the output of the differential amplifier 120. In a further modification of the embodiment shown in FIG. 2, the upper input of the AND-gate 130 in FIG. 2 may also be acted upon by using an acceleration sensor attached to the housing 56 and measuring accelerations in the direction of the axis of the housing.

Figure 3:
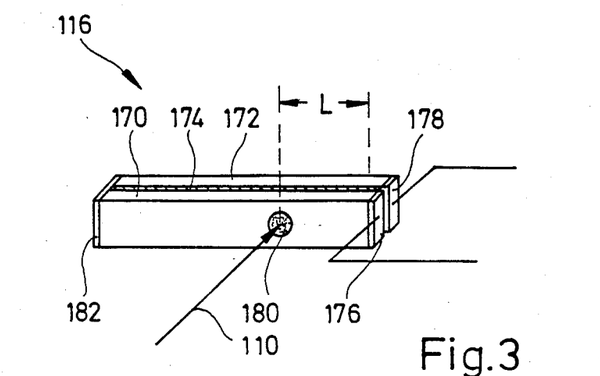
FIG. 3 is a perspective view of an opto-electrical transducer used in the measuring head according to FIG. 2.

FIG. 3 is a perspective view of one of the transducers 116, 118 or 158, 160 used in the measuring head 16 according to FIG. 2. The transducer 116 illustrated in this Figure has a bar-like geometry and consists of a p-conducting layer 170 and of a n-conducting layer 172. Located between these layers is a p-n-transition designated by the reference numeral 174. Electrodes 176, 178 are fitted on one end face of the layers 170, 172. In FIG. 3, the light spot produced by the incident pencil of light 110 is designated by the reference numeral 180.

If no light falls on the transducer 116, then current sent through the transducers must pass completely through the two layers 170 and 172 and is conducted from one layer to the other by an electrode 182 located on the end face lying on the left in FIG. 3. On the other hand if light falls onto the transducer, then at the point of incidence, by way of the p-n-transition, a short circuit between the two layers 170, 172 is produced. It will be seen that the resistance of the transducer measured between the electrodes 176, 178 is directly proportional to the distance of the light spot 180, designated by the reference L, from the end of the transducer 116 on the right in FIG. 3.

It will also be noted that with a pre-determined total intensity of the incident light, in the transducer illustrated in FIG. 3, the resistance between the electrodes 176, 178 is determined by the geometric point of concentration of the light spot 180, the specific shape of the boundary contour of the light spot 180 is not important, since positive and negative center differences of the light spots are accentuated.

Figure 4:
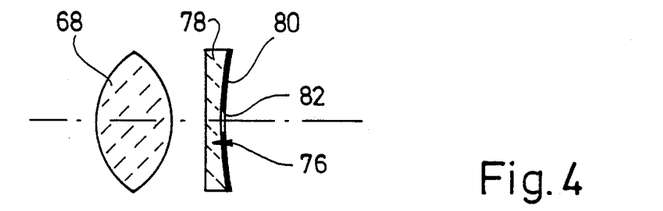
FIGS. 4 to 8 are diagrammatic sectional views of modified objective/mirror units for alternative use in the measuring head according to FIG. 2.

FIG. 4 shows diagrammatically a modified lens/mirror unit, in which the mirrored surface of the base member 78 of the mirror 76 is also curved in order to compensate for considerable edge distortion of the lens 68. As in FIG. 2, the ratios of curvature of the optical members are not shown according to scale.

Figure 5:
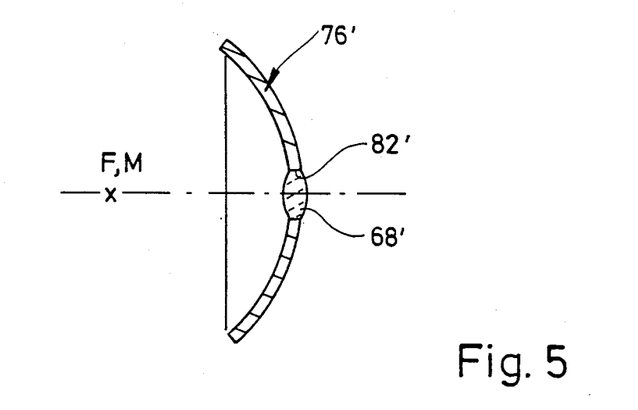

FIG. 5 shows a further modified lens/mirror unit, in which a concave mirror 76' is used. This has a central opening 82', in which the lens 68' having a small diameter is cemented. The concave mirror 76' has a radius of curvature which corresponds to the focal length of the lens 68', so that the center M of the concave mirror 76' and the focal point F of the lens 68' coincide. In the arrangement according to FIG. 5 also, rays reflected by the reflecting measuring surface with considerable tilting towards the optical axis of the apparatus are thrown back on themselves by the concave mirror 76', reflected on the measuring surface a second time under the same conditions and supplied to the detection system essentially on the optical axis of the apparatus.

Figure 8:
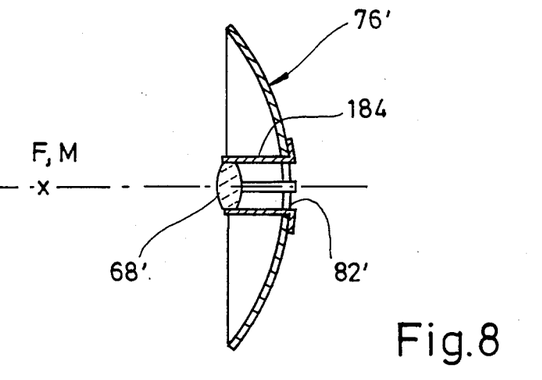

As a modification of the embodiment illustrated in FIG. 5, the concave mirror 76' may also be moved towards the right in FIG. 5, until its edge lies in the plane of the lens 68'. The radius of curvature of the concave mirror 76' is adapted accordingly, the lens 68' is attached to the concave mirror 76' by way of several axial supports 184 distributed in the peripheral direction, as shown in FIG. 8. The lens/mirror unit according to FIG. 8 may also be moved up very close to the measuring surface.

Figure 6:
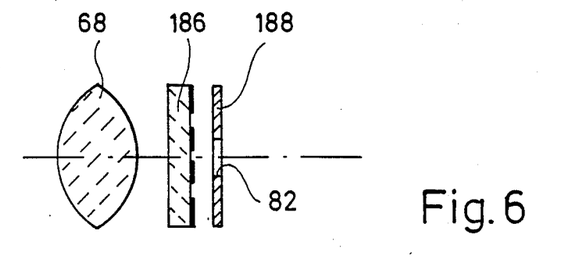

FIG. 6 shows a lens/mirror unit, in which the base member 78 of the mirror 76 according to FIG. 4, at the same time correcting distortion errors, is replaced by an equivalent correction-reflection hologram 186, whereof the areas of different density are shown diagrammatically as an interrupted coating on a transparent base member. Located behind the reflection hologram 186 is a mirror 188, which is again provided in the center with an opening 82.

Figure 7:
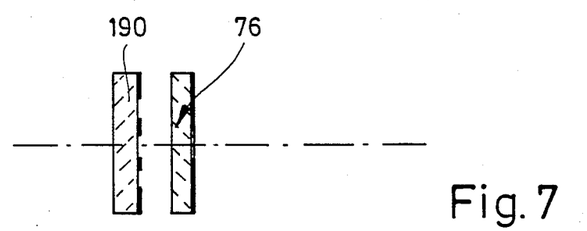

In the lens/mirror unit shown in FIG. 7, the lens objective 68 of FIG. 2 is replaced by a transmission hologram 190, in which once again the areas of different density are shown diagrammatically by an interrupted coating of a transparent base member. The transmission hologram 190 is a copy of an original hologram obtained by reproduction techniques, which was recorded using a highly corrected, distortion-free lens produced as an individual component, whereof the focal length corresponds to that of the lens 68. The flat mirror 76 can be used unchanged together with the transmission hologram 190.

For the combined spot measurement and integral measurement with two different monochromatic light sources, the transmission hologram consists of the superimposition of two "density" -patterns of different colours, whereof one is transparent for the first wave length and the other is transparent for the other wave length. These "density" -patterns are respectively produced under exact focussing conditions using the above mentioned highly corrected lens and respectively one of the wave lengths used.

Alternatively one can use an analog combination transmission hologram also for spot measurement and integral measurement using differently polarized light.

Figure 9:
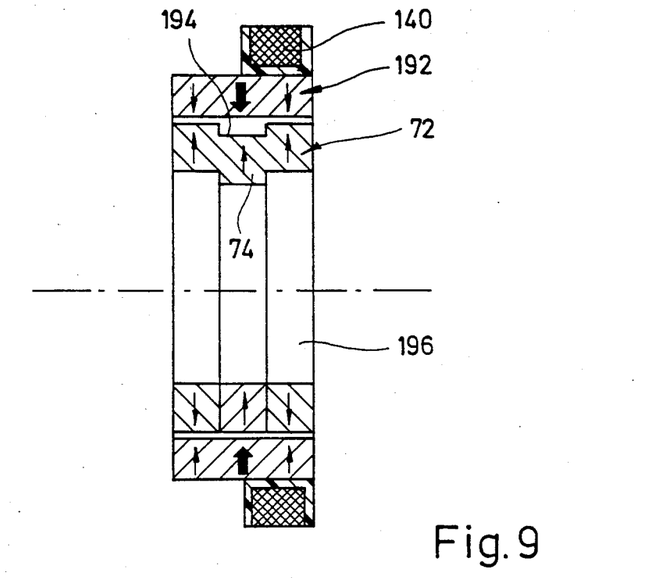
FIG. 9 is an axial section through a modified objective servo-motor for the measuring head shown in FIG. 2.

FIG. 9 shows a modified servo-motor for the axial displacement of the lens, in which case two slightly different embodiments are illustrated above and below the axis of the apparatus.

The adjusting sleeve 72 is permanently magnetised in the radial direction, as indicated by arrows. Provided around the latter is a permanently radially magnetised bearing sleeve 190, which is fixed to the measuring head housing. As illustrated, the magnetisation directions of the adjusting sleeve 72 and bearing housing 190 oppose each other, so that these two sleeves abut against each other in the radial direction and thus the adjusting sleeve 72 is mounted radially without friction inside the bearing sleeve 190.

The upper and lower parts of FIG. 9 vary as regards the pre-tensioning of the adjusting sleeve 72 in a central inoperative position. In the upper embodiment, the bearing sleeve 190 is magnetised more considerably in its axial center, as indicated by a thicker arrow. In its center the adjusting sleeve has a peripheral groove 194, which follows the positioning collar 74 and moreover is magnetised homogeneously. Thus the adjusting sleeve 72 attempts to adjust itself axially so that the peripheral groove 194 lies opposite the more highly magnetised region of the bearing sleeve 190. In the lower embodiment, the adjusting sleeve 172 has a central sleeve section 196 simultaneously forming the positioning collar 74, which section 196 has the same polarity as the bearing sleeve 190, so that an alignment of the adjusting sleeve 72 with the axial center of the bearing sleeve 190 is again obtained.

The annular coil 140 is again provided for deflecting the adjusting sleeve 72 from its axial center position in one or other direction.

In contrast to metal springs, when using magnetic springs, as was already described with reference to FIG. 9, the spring characteristic is virtually temperature-dependent. The spring characteristic may also be varied within wide limits in a simple manner by a different choice of the magnetisation profile and/or of the geometry of the opposing peripheral surfaces of the adjusting sleeve 72 and bearing sleeve 190.

Sleeve bodies, having axially varying magnetisation, as were described above, may be obtained for example by being stuck in homogeneously magnetised annular members.

Figure 10:
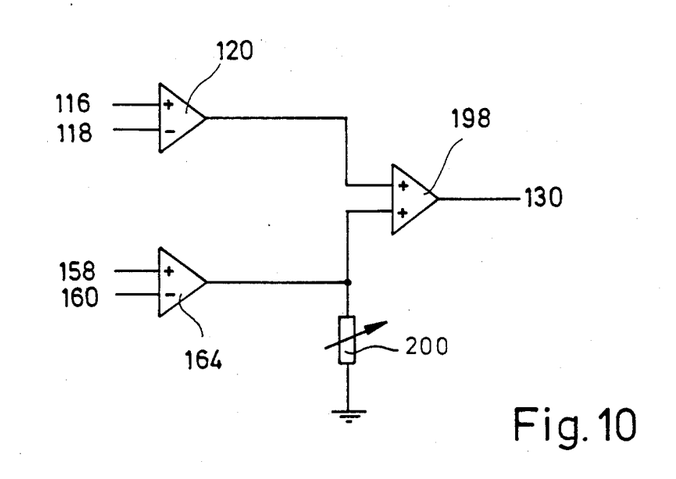
FIG. 10 shows a modified vibration detector circuit for the measuring head according to FIG. 2.

In place of the blocking control circuit 166 described with reference to FIG. 2, which operates on a frequency basis, according to FIG. 10 one can also supply the output signals of the two differential amplifiers 120 and 164 to the inputs of a summing amplifier 198, in which case for adaptation of the basic sensitivity of the two light measuring channels (for example determined by varying brightness of the light sources), an adaptation network is provided, which in this case is shown as an adjustable bleeder resistance 200 connected to the output of the differential amplifier 164.

In the case of defocussing caused by vibrations, the output signals of the differential amplifiers 120 and 164 change in the same direction, so that one obtains an output signal of the summing amplifier 198. On the other hand, in the case of defocussing caused by the measuring surface, these output signals of the differential amplifier vary in the opposite direction, so that no output signal is obtained at the summing amplifier 198. Thus, after inversion in an inverter 202, this output signal may serve for controlling the AND-gate 130 of FIG. 2.

I claim:

1. Apparatus for determining the local distance of a measuring surface from a reference surface comprising in combination:
   (a) a light source having a small diameter,
   (b) a photoelectric arrangement that includes at least two transducers (116, 118),
   (c) a lens (68) for focussing said light source on a local region of the measuring surface and for focussing the light not produced there by the light source on said photoelectric transducer arrangement,
   (d) a deflection device for the spatial separation of the light reflected by the measuring surface from the incident light thereon, said device being located on the optical axis of the apparatus between the lens and the light source,
   (e) a beam divider that is located in the path of light behind the deflection device, said beam divider dividing the reflected light into two partial beams, one of which impinges on an associated transducer or said transducer arrangement, and
   (f) a differential amplifier which receives the output signals of the two transducers characterized in that
       (1) the lens (68) is pre-tensioned in an axial position and can be displaced axially against the pre-tensioning force by an electro-magnet (74, 140);
       (2) a supply circuit increases or reduces the supply current to the electromagnet (74, 140) depending on the sign of the output signal of the differential amplifier (120); and
       (3) a signal associated with the supply current is made available as the measuring signal associated with the distance to be measured.

2. Apparatus according to claim 1, characterised by a characteristic transforming circuit (146), which at its input receives a signal proportional to the supply current and modifies this according to a characteristic compensating the non-linearity of the mechanical pre-tensioning force, in which case the output signal of the characteristic transforming circuit (146) represents the measuring signal.

3. Apparatus according to claim 1, characterized in that the lens (68) is held by at least one annular spring member (84, 86) centered on the optical axis of the apparatus.

4. Apparatus according to claim 3, characterised in that slots (88) defining individual spring arms emanate from the inner edges of the annular spring members (84, 86).

5. Apparatus according to claim 1, characterised in that the lens (68) is centered on the axis of the apparatus by a magnetic radial bearing (72, 190).

6. Apparatus according to claim 5, characterized in that the magnetic radial bearing (72, 190) has magnetic inhomogeneity, due to which the movable bearing part is pre-tensioned in an axial inoperative position.

7. Apparatus according to claim 1, characterized in that the electro-magnet comprises a toroidal coil (140) arranged coaxially with respect to the optical axis of the apparatus and located outside the path of the lens (68) as well as a rotationally symmetrical magnetic part (74) connected to the lens (68).

8. Apparatus for determining the local distance of a measuring surface from a reference surface comprising in combination:
   (a) a light source having a small diameter,
   (b) a photoelectric arrangement that includes at least two transducers (116, 118),
   (c) a lens (68) for focussing said light source on a local region of the measuring surface and for focusing the light not produced there by the light source on a photoelectric transducer arrangement that includes at least two transducers (116, 118);
   (d) a deflection device for the spatial separation of the light reflected by the measuring surface from the incident light thereon, said device being located on the optical axis of the apparatus between the lens and the light source,
   (e) a beam divider that is located in the path of light behind the deflection device, said beam divider dividing the reflected light into two partial beams, one of which impinges on an associated transducer of said transducer arrangement,
   (f) a differential amplifier which receives the output signals of the two transducers characterized in that
       (1) the lens (68) is pre-tensioned in an axial position and can be displaced axially against the pre-tensioning force by an electro-magnet (74, 140);
       (2) a supply circuit increases or reduces the supply current to the electromagnet (74, 140) depending on the sign of the output signal of the differential amplifier (120); and
       (3) a signal associated with the supply current is made available as the measuring signal associated with the distance to be measured, and
   (g) a rotationally symmetrical reflector device (68, 76, 76', 186, 188, 76) surrounding an active central region of the lens (68), which returns light rays reflected by the measuring surface (14) with a considerable inclination with respect to the axis of the apparatus, essentially towards the measuring surface (14).

9. Apparatus according to claim 8, characterized in that the reflector device is formed by an edge region of the lens adjoining the central region of the lens (68) having a large diameter and by a mirror (76) located behind the latter and which is substantially plane and is arranged vertically on the axis of the apparatus.

10. Apparatus according to claim 9, characterised in that the mirror (76) has a transparent base member (78) and a reflecting layer (80) remote from the lens (68), which in the centre has an opening (82) defining the rectly active central region of the lens (68).

11. Apparatus according to claim 9, characterised in that the mirrored surface of the mirror base member (78) is curved for the compensation of the edge distortion of the lens (68).

12. Apparatus according to claim 8, characterised in that the reflector device comprises a concave mirror (76'), which on its axis has an opening (82') whereof the diameter corresponds to that of the lens (68') of small diameter and that the centre of curvature (M) of the concave mirror (76') coincides with the focal point (F) of the lens (68') on the side of the measuring surface.

13. Apparatus according to claim 8, characterised in that the reflector device comprises a reflection hologram (186), which compensates for the edge distortion of the lens (68), as well as a mirror (188) located there behind with an opening (82) defining the directly active central region of the lens (68).

14. Apparatus according to claim 1, characterised in that the lens is formed by a transmission hologram (190).

15. Apparatus for determining the local distance of a measuring surface from a reference surface comprising in combination:
(a) a light source having a small diameter,
(b) a photoelectric arrangement that includes at least two transducers (116, 118)
(c) a lens (68) for focussing said light source on a local region of the measuring surface and for focussing the light not produced there by the light source on said photoelectric transducer arrangement,
(d) a deflection device for the spatial separation of the light reflected by the measuring surface from the incident light thereon, said device being located on the optical axis of the apparatus between the lens and the light source,
(e) a beam divider that is located in the path of light behind the deflection device, said beam divider dividing the reflected light into two partial beams, one of which impinges on an associated transducer of said transducer arrangement, and
(f) a differential amplifier which receives the output signals of the two transducers characterized in that
(1) the lens (68) is pre-tensioned in an axial position and can be displaced axially against the pre-tensioning force by an electro-magnet (74, 140);
(2) a supply circuit increases or reduces the supply current to the electromagnet (74, 140) depending on the sign of the output signal of the differential amplifier (120); and
(3) a signal associated with the supply current is made available as the measuring signal associated with the distance to be measured, said transducers each being formed by an elongated, barlike p-n-structure (170 to 174), in which case the plane of the p-n-transition (174) is arranged substantially vertically with respect to the direction of incidence of the light and the transducer axis extends parallel to the direction in which the incident light (110) travels when the lens (68) is defocussed.

16. Apparatus for determining the local distance of a measuring surface from a reference surface comprising in combination:
(a) a light source having a small diameter,
(b) a photoelectric arrangement that includes at least two transducers (116, 118),
(c) a lens (68) for focussing said light source on a local region of the measuring surface and for focussing the light not produced there by the light source on said photoelectric transducer arrangement,
(d) a deflection device for the spatial separation of the light reflected by the measuring surface from the incident light thereon, said device being located on the optical axis of the apparatus between the lens and the light source,
(e) a beam divider that is located in the path of light behind the deflection device, said beam divider dividing the reflected light into two partial beams, one of which impinges on an associated transducer of said transducer arrangment, and
(f) a differential amplifier which receives the output signals of the two transducers characterized in that
(1) the lens (68) is pre-tensioned in an axial position and can be displaced axially against the pre-tensioning force by an electro-magnet (74, 140);
(2) a supply circuit increases or reduces the supply current to the electromagnet (74, 140) depending on the sign of the output signal of the differential amplifier (120), and
(3) a signal associated with the supply current is made available as the measuring signal associated with the distance to be measured,
said supply circuit comprising an up/down counter (134), whereof the counting terminals can be connected to the output of a free wheeling pulse generator (132) by way of a switch (126, 128) operated depending on the output signal of the differential amplifier (120).

17. Apparatus for determining the local distance of a measuring surface from a reference surface comprising in combination:
(a) a light source having a small diameter,
(b) a photoelectric arangement that includes at least two transducers (116, 118),
(c) a lens (68) for focussing said light source on a local region of the measuring surface and for focussing the light not produced thereby by the light source on said photoelectric transducer arrangement,
(d) a deflection device for the spatial separation of the light reflected by the measuring surface from the incident light thereon, said device being located on the optical axis of the apparatus between the lens and the light source,
(e) a beam divider that is located in the path of light behind the deflection device, said beam divider dividing the reflected light into two partial beams, one of which impinges on an associated transducer of said transducer arrangement,
(f) a differential amplifier which receives the output signals of the two transducers characterized in that (1) the lens (68) is pre-tensioned in an axial position and can be displaced axially against the pre-tensioning force by an electro-magnet (74, 140);

(2) a supply circuit increases or reduces the supply current to the electromagnet (74, 140) depending on the sign of the output signal of the differential amplifier (120); and (3) a signal associated with the supply current is made available as the measuring signal associated with the distance to be measured, and (g) a second annular light source (64) which makes available a light beam (66) having a spectrum which different from the light of the first light source (60) and is located essentially in the same plane as the first light source, so that in addition to the light spot of the first spectrum having a very small diameter, the lens (68) produces on the measuring surface (14) a light ring of a different, second spectrum with a large diameter in comparison with the light spot; a secondary deflection device (92) provided between the light source arrangement (60, 64) and the lens (68) which throws a second partial quantity of reflected light by way of a further beam divider (96, 98) onto a second transducer arrangement (158, 160), which is separated spatially from the first transducer arrangement (116, 118), a filter (114) located in front of the first transducer arrangement (116, 118) for the first type of light and a filter (162) located in front of the second transducer arrangement (158,160) for the second type of light; that the partial quantity of reflected light deflected by the second deflection device (92) is split by the second beam divider (96, 98) into two spatially separted partial beams (154, 156), which are supplied to two spatially separated transducers (158, 160) of the second transducer arrangement; and that these two transducers (158,160) are connected to inputs of a second differential amplifier (164).

18. Apparatus according to claim 17 in conjunction with claim 14, characterised in that the first light source (60) and the second light source (64) make available light with two different wave lengths or two different polarizations and the transmission hologram (190) is a superimposition of two partial holograms, which are respectively active for the light of one light source and inactive for the light of the other light source and are each produced with the light in question under ideal focussing conditions using the same master optical system.

19. Apparatus according to claim 17, characterised by an intermediate wall (102) of the housing (56), which interrupts the visual connection between the two transducer arrangements.

20. Apparatus according to claim 17, characterised by a change-over switch (122), by which either the output of the first differential amplifier (120) or the output of the second differential amplifier (164) can be connected to the control terminal of the supply circuit (130 to 138).

21. Apparatus for determining the local distance of a measuring surface from a reference surface comprising in combination:

(a) a light source having a small diameter, (b) a photoelectric arrangement that includes at least two transducers (116, 118)

(c) a lens (68) for focussing said light source on a local region of the measuring surface and for focussing the light not produced there by the light source on said photoelectric transducer arrangement, (d) a deflection device for the spatial separation of the light reflected by the measuring surface from the incident light thereon, said device being located on the optical axis of the apparatus between the lens and the light source, (e) a beam divider that is located in the path of light behind the deflection device, said beam divider dividing the reflected light into two partial beams, one of which impinges on an associated transducer of said transducer arrangement, (f) a differential amplifier which receives the output signals of the two transducers characterized in that (1) the lens (68) is pre-tensioned in an axial position and can be displaced axially against the pre-tensioning force by an electro-magnet (74, 140);

(2) a supply circuit increases or reduces the supply current to the electromagnet (74, 140) depending on the sign of the output signal of the differential amplifier (120); and (3) a signal associated with the supply current is made available as the measuring signal associated with the distance to be measured, and (g) acceleration sensor (64, 68, 158, 160, 164, 166, 198) carried by the apparatus (56) which is active in the direction of the axis of the apparatus and by a blocking circuit (130) associated with the control terminal of the supply circuit, which is put into the blocking state by an out put signal of the acceleration sensor indicating an acceleration of the apparatus.

22. Apparatus according to claim 21, characterised in that the acceleration sensor comprises a blocking control circuit (166) containing a frequency filter, whereof the input is connected to the output of the first differential amplifier (120) or preferably to the output of the second differential amplifier (164) and whereof the output is connected to the control terminal of the blocking circuit (130).

23. Apparatus according to claim 21, characterised in that the acceleration sensor comprises a summing amplifier (198) receiving the output signals of the two differential amplifiers (120, 164).

* * * * *